(12) United States Patent
Singh (10) Patent No.: US 10,733,000 B1
(45) Date of Patent: Aug. 4, 2020

(54) SYSTEMS AND METHODS FOR PROVIDING RELEVANT SOFTWARE DOCUMENTATION TO USERS

(71) Applicant: Juniper Networks, Inc., Sunnyvale, CA (US)

(72) Inventor: Neha Singh, San Jose, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 198 days.

(21) Appl. No.: 15/818,846

(22) Filed: Nov. 21, 2017

(51) Int. Cl.
*G06F 9/451* (2018.01)
*G06F 3/0481* (2013.01)
*G06F 3/0482* (2013.01)

(52) U.S. Cl.
CPC ............ *G06F 9/453* (2018.02); *G06F 3/0482* (2013.01); *G06F 3/04812* (2013.01)

(58) Field of Classification Search
CPC ..... G06F 9/453; G06F 3/04812; G06F 3/0482
See application file for complete search history.

(56) References Cited

U.S. PATENT DOCUMENTS

| | | | | |
|---|---|---|---|---|
| 5,546,521 A * | 8/1996 | Martinez | ................. | G06F 9/453 715/711 |
| 6,587,122 B1 * | 7/2003 | King | ....................... | G06F 9/453 715/708 |
| 8,001,470 B1 * | 8/2011 | Chen | ....................... | G06F 9/453 715/714 |
| 8,042,095 B2 * | 10/2011 | Low | .......................... | G06F 8/20 717/113 |
| 8,271,876 B2 * | 9/2012 | Brugler | .................... | G06F 9/453 715/708 |
| 9,141,348 B1 * | 9/2015 | Bienkowski | ............ | G06F 9/453 |
| 2004/0145601 A1 * | 7/2004 | Brielmann | .............. | G06F 9/453 715/708 |
| 2005/0114778 A1 * | 5/2005 | Branson | ................... | G06F 9/453 715/711 |
| 2005/0138559 A1 * | 6/2005 | Santos-Gomez | ....... | G06F 9/453 715/709 |
| 2006/0277468 A1 * | 12/2006 | Sapir | ....................... | G06F 9/453 715/708 |

(Continued)

OTHER PUBLICATIONS

Katie Sherwin, "Pop-ups and Adaptive Help Get a Refresh", published to web on Mar. 15, 2015 at https://www/.nngroup.com/articles/pop-up-adaptive-help/, retrieved by Examiner on Apr. 2, 2020 (Year: 2015).*

(Continued)

*Primary Examiner* — Shourjo Dasgupta
(74) *Attorney, Agent, or Firm* — FisherBroyles, LLP (57) ABSTRACT

The disclosed computer-implemented method may include (1) determining that a user is viewing a user interface of an application, (2) detecting that the user has requested assistance with interacting with a specific portion of content displayed within the user interface, and then (3) assisting the user with interacting with the specific portion of content by (A) identifying, within a repository of software documentation that describes features of the application, information relevant to utilizing the specific portion of content and (B) dynamically integrating the relevant information into the user interface. Various other methods, systems, and computer-readable media are also disclosed.

16 Claims, 7 Drawing Sheets

(56) References Cited

U.S. PATENT DOCUMENTS

| | | | | |
|---|---|---|---|---|
| 2007/0220428 A1* | 9/2007 | Kureshy | ............. | G06F 3/04895 |
| | | | | 715/708 |
| 2009/0210749 A1* | 8/2009 | Hayutin | ................ | G06F 11/368 |
| | | | | 714/38.1 |
| 2011/0246880 A1* | 10/2011 | Horton | .................... | G06F 9/453 |
| | | | | 715/708 |
| 2011/0314375 A1* | 12/2011 | Zaika | .................... | G06F 3/0482 |
| | | | | 715/708 |
| 2012/0072867 A1* | 3/2012 | Schlegel | .............. | G06F 3/0481 |
| | | | | 715/808 |
| 2013/0007643 A1* | 1/2013 | Edwards | ................... | G06F 3/01 |
| | | | | 715/763 |
| 2013/0097500 A1* | 4/2013 | Rajagopal | .............. | G06F 9/453 |
| | | | | 715/711 |
| 2014/0006944 A1* | 1/2014 | Selig | ....................... | G06F 9/453 |
| | | | | 715/705 |
| 2014/0165000 A1* | 6/2014 | Fleizach | ............... | H04M 19/04 |
| | | | | 715/810 |
| 2014/0173474 A1* | 6/2014 | Klemenz | ................ | G06F 9/453 |
| | | | | 715/765 |
| 2014/0181735 A1* | 6/2014 | Lee | ....................... | G06F 3/0485 |
| | | | | 715/786 |
| 2014/0280296 A1* | 9/2014 | Johnston | ............ | G06K 9/00302 |
| | | | | 707/769 |
| 2016/0092081 A1* | 3/2016 | Reichle | ..................... | G06F 8/38 |
| | | | | 715/765 |
| 2018/0068577 A1* | 3/2018 | Javanbakht | .............. | G09B 5/14 |
| 2018/0284954 A1* | 10/2018 | Alcorn | .................. | G06F 3/0482 |
| 2019/0130006 A1* | 5/2019 | Raviv | ................. | G06F 16/2428 |

OTHER PUBLICATIONS

Wikipedia; User Interface; https://en.wikipedia.org/wiki/User_interface; Nov. 14, 2017.

Wikipedia; Software Documentation; https://en.wikipedia.org/wiki/Software_documentation; Nov. 14, 2017.

* cited by examiner

FIG. 7

SYSTEMS AND METHODS FOR PROVIDING RELEVANT SOFTWARE DOCUMENTATION TO USERS

BACKGROUND

Software developers often compile and distribute software documentation that explains the functionality of various features of their software applications. In one example, software documentation may include and/or represent a technical manual containing information that enables users to navigate and/or operate an application. Traditionally, software documentation may be stored in a file, document, and/or website that is separate from the application itself. For example, documentation for an application may be compiled within a .PDF document or a similar type of file. When a user is unsure of how to properly utilize a particular feature of the application, the user may access the file and then search for information that is relevant to the particular feature.

Unfortunately, extracting useful information from traditional software documentation systems may be complicated, tedious, and/or ineffective. For example, a user may end up sifting through dozens of irrelevant documentation pages before finding information that is pertinent to a specific question or feature. Moreover, users may be deterred from accessing documentation for an application if the documentation is not readily available (e.g., if the documentation must be accessed or opened in a different window than the window that displays the application). Accordingly, while software documentation may contain valuable information about features of an application, users may be unable and/or unwilling to efficiently access and/or utilize this information.

The instant disclosure, therefore, identifies and addresses a need for systems and methods for providing relevant software documentation to users.

SUMMARY

As will be described in greater detail below, the instant disclosure generally relates to systems and methods for providing relevant software documentation to users. In one example, a computer-implemented method for providing relevant software documentation to users may include (1) determining that a user is viewing a user interface of an application, (2) detecting that the user has requested assistance with interacting with a specific portion of content displayed within the user interface, and then (3) assisting the user with interacting with the specific portion of content by (A) identifying, within a repository of software documentation that describes features of the application, information relevant to utilizing the specific portion of content and (B) dynamically integrating the relevant information into the user interface.

As another example, a system for implementing the above-described method may include various modules stored in memory. The system may also include at least one physical processor that executes these modules. For example, the system may include (1) a determination module that determines that a user is viewing a user interface of an application, (2) a detection module that detects that the user has requested assistance with interacting with a specific portion of content displayed within the user interface, and (3) an assistance module that assists the user with interacting with the specific portion of content by (A) identifying, within a repository of software documentation that describes features of the application, information relevant to utilizing the specific portion of content and (B) dynamically integrating the relevant information into the user interface.

As a further example, the above-described method may be encoded as computer-readable instructions on a non-transitory computer-readable medium. For example, a computer-readable medium may include one or more computer-executable instructions that, when executed by at least one processor of a computing device, cause the computing device to (1) determine that a user is viewing a user interface of an application, (2) detect that the user has requested assistance with interacting with a specific portion of content displayed within the user interface, and then (3) assist the user with interacting with the specific portion of content by (A) identifying, within a repository of software documentation that describes features of the application, information relevant to utilizing the specific portion of content and (B) dynamically integrating the relevant information into the user interface.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for providing relevant software documentation to users. As will be explained in greater detail below, embodiments of the instant disclosure may provide relevant portions of software documentation for an application to a user that is attempting to interact with content within the application. Specifically, the disclosed systems and methods may determine that a user requests assistance with a specific feature of an application and then dynamically display, to the user, information that instructs the user about how to utilize the specific feature. This information may be efficiently and seamlessly incorporated into a user interface of the application. As such, the disclosed systems and methods may directly and conveniently provide the user with relevant information contained within software documentation, thereby potentially mitigating and/or eliminating the need for the user to manually (and tediously) search through the documentation to identify the information.

Embodiments of the instant disclosure may also provide interactive elements within user interfaces of an application that enable users to locate important features of the application. For example, the disclosed systems and methods may incorporate, into a user interface of an application, clickable links that cause visual pointers (e.g., arrows) to be displayed within the user interface. These pointers may direct a user's attention to particular elements of the application, thereby further improving the ability of a user to understand and interact with content of the application.

Figure 1:
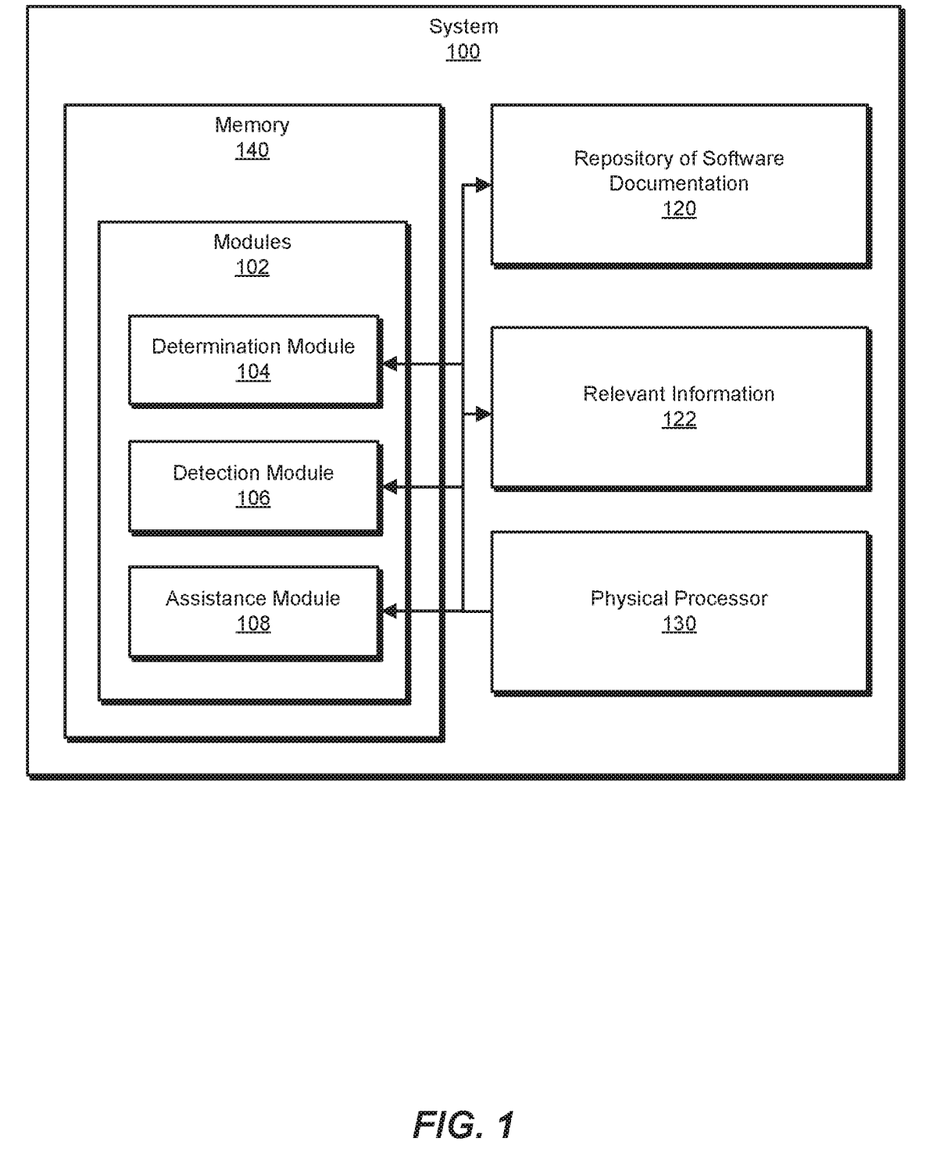
FIG. 1 is a block diagram of an exemplary system for providing relevant software documentation to users.
Figure 2:
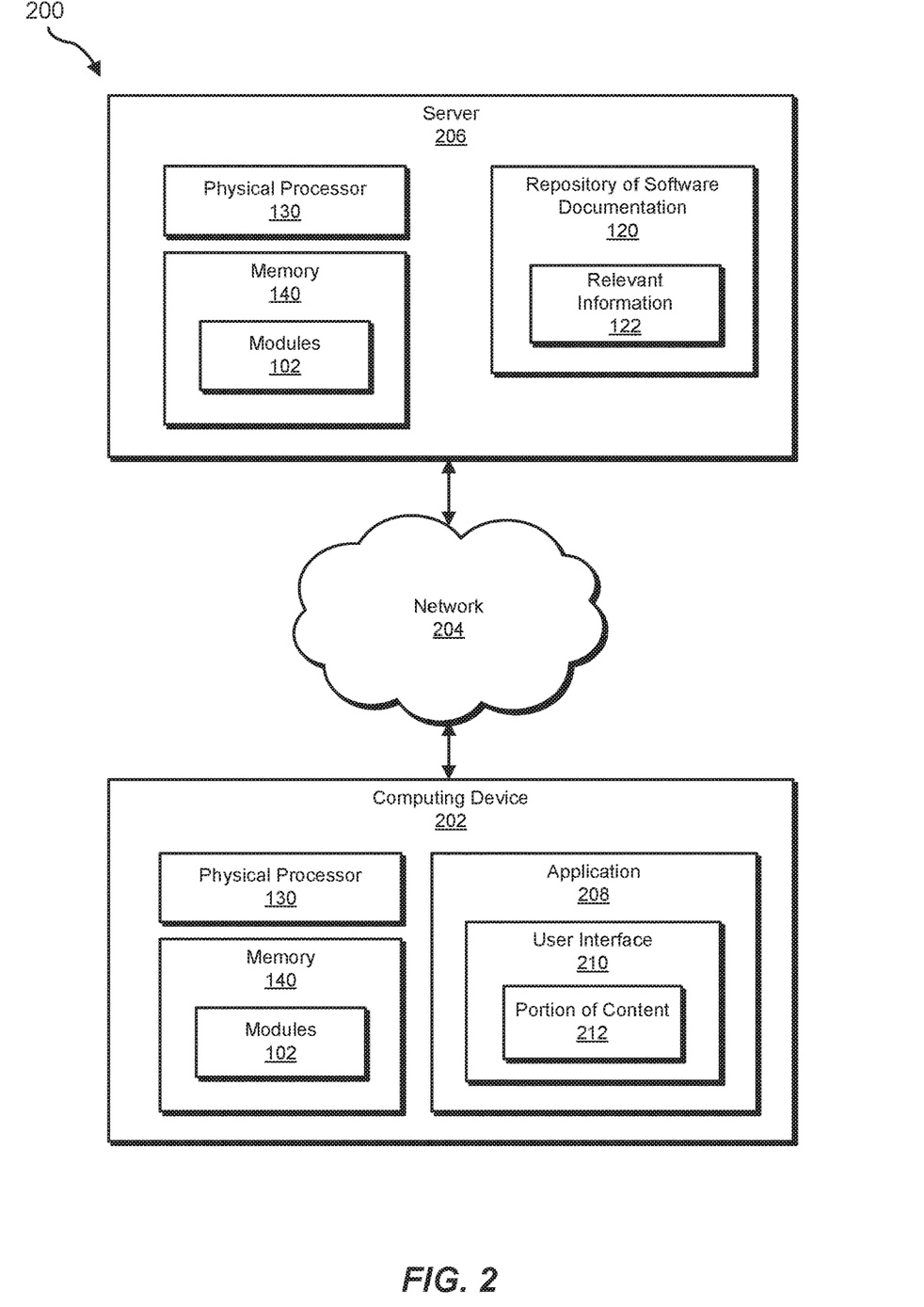
FIG. 2 is a block diagram of an additional exemplary system for providing relevant software documentation to users.

The following will provide, with reference to FIGS. 1 and 2, detailed descriptions of exemplary systems for providing relevant software documentation to users. Detailed descriptions of corresponding computer-implemented methods will be provided in connection with FIG. 3. Detailed descriptions of exemplary user interfaces of applications will be provided in connection with FIG. 4. In addition, detailed descriptions of exemplary visual panels and visual pointers incorporated into user interfaces will be provided in connection with FIGS. 5 and 6, respectively. Finally, detailed descriptions of an exemplary computing system will be provided in connection with FIG. 7.

FIG. 1 is a block diagram of an exemplary system 100 for providing relevant software documentation to users. As illustrated in this figure, exemplary system 100 may include one or more modules 102 for performing one or more tasks. As will be explained in greater detail below, modules 102 may include a determination module 104, a detection module 106, and an assistance module 108. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate providing relevant software documentation to users. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may also include a repository of software documentation 120. Repository of software documentation 120 generally represents any database, collection, and/or set of files that store software documentation associated with one or more software applications. Repository of software documentation 120 may be stored within the devices illustrated in FIG. 2 (e.g., computing device 202 and/or server 206) or any other suitable storage device.

The term "software documentation," as used herein, generally refers to any information and/or instructions that describe features of an application and/or indicate how to utilize features of an application. For example, software documentation may include and/or represent a technical manual that explains the functionality of various elements of an application. In other words, software documentation may contain information designed to enable a user to efficiently and effectively interact with an application.

Traditional software documentation may generally be compiled and/or stored in a document and/or location that is separate from the application it describes. For example, a conventional system for managing software documentation may store documentation for an application within a file, document, and/or website that is accessed remotely from the application. A user that wishes to obtain knowledge about a particular feature of an application may access the application's documentation (e.g., by opening the documentation in a separate window than the window that displays the application). The user may then search through the documentation to identify information relevant to the particular feature. While such traditional documentation systems may contain helpful and/or valuable information about various features of an application, identifying such information may be difficult and/or tedious for many users.

In some examples, repository of software documentation 120 may store traditional software documentation (e.g., documentation that was compiled by a developer of an application and/or intended to be accessed directly by users of the application). Additionally or alternatively, repository of software documentation 120 may store software documentation that was generated specifically to be utilized by the disclosed systems.

In the example of FIG. 1, repository of software documentation 120 may include relevant information 122. Relevant information 122 generally represents any portion of information within repository of software documentation 120 that describes and/or is associated with a particular element or feature of an application that is of particular interest to a user. As will be explained in greater detail below, the disclosed systems may dynamically incorporate relevant information 122 into a user interface of an application such that the user is presented with relevant information 122 without having to search through a document or database that stores documentation for the application.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to provide relevant software documentation to a user of computing device 202.

Computing device 202 generally represents any type or form of computing device capable of reading computer-executable instructions. In one example, computing device 202 may represent a personal computing device that is managed by a user and/or an enterprise. Additional examples of computing device 202 include, without limitation, laptops, tablets, desktops, servers, switches, hubs, modems, bridges, repeaters, gateways, multiplexers, network adapters, network interfaces, network racks, chasses, storage devices, client devices, cellular phones, Personal Digital Assistants (PDAs), multimedia players, embedded systems, wearable devices, gaming consoles, portions of one or more of the same, combinations or variations of one or more of the same, and/or any other suitable computing device. Although FIG. 2 illustrates computing device 202 as being external to network 204, computing device 202 may alternatively represent and/or be included in network 204.

Server 206 generally represents any type or form of computing device capable of storing, maintaining, and/or searching repositories of software documentation. Additional examples of server 206 include, without limitation, security servers, application servers, storage servers, and/or database servers configured to run certain software applications and/or provide various security, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Application 208 generally represents any type or form of software-based application that may be executed and/or operated by a computing device (such as computing device 202). Examples of application 208 include, without limitation, desktop applications, mobile applications, cloud-based applications, gaming applications, word-processing applications, business applications, communications applications, media applications, educational applications, variations or combinations of one or more of the same, and/or any other suitable application.

In some embodiments, application 208 may contain and/or provide a variety of services and/or interactive features. These features and services may be presented to a user via one or more user interfaces, such as a user interface 210. The term "user interface," as used herein, generally refers to any portal and/or window that displays content to a user and/or that is configured to accept and handle user input. In the example of FIG. 2, user interface 210 may contain one or more portions of content, such as a portion of content 212. Portion of content 212 generally represents any particular element within user interface 210 with which a user may interact. In other words, portion of content 212 may be distinct from other portions of content within user interface 210.

Figure 3:
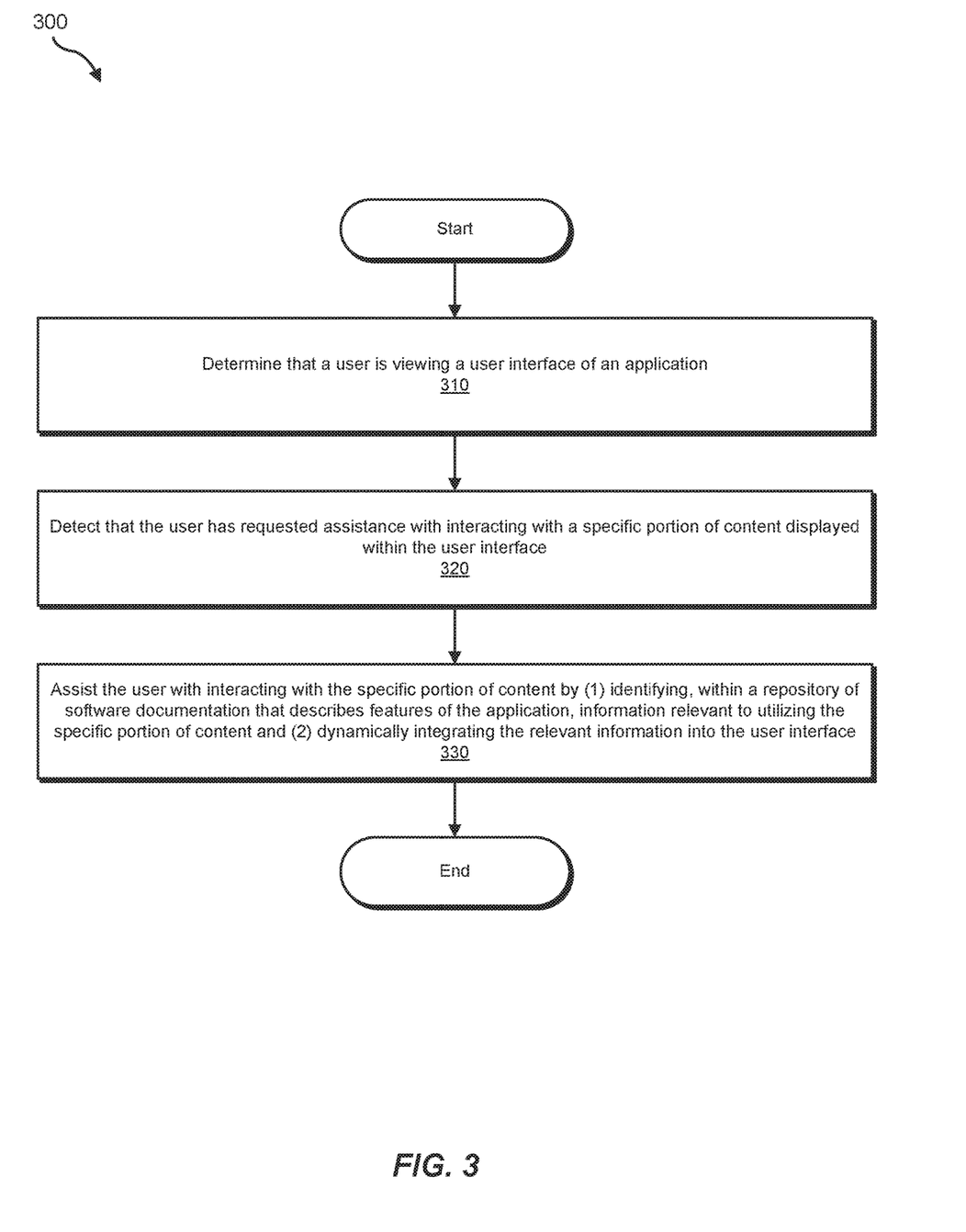
FIG. 3 is a flow diagram of an exemplary method for providing relevant software documentation to users.

FIG. 3 is a flow diagram of an example computer-implemented method 300 for providing relevant software documentation to users. The steps shown in FIG. 3 may be performed by any suitable computer-executable code and/or computing system, including system 100 in FIG. 1, system 300 in FIG. 3 and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may determine that a user is viewing a user interface of an application. For example, determination module 104 may, as part of computing device 202 in FIG. 2, determine that a user is viewing user interface 210 of application 208. In this example, application 208 may represent an application that is installed on and/or configured to run on computing device 202. In addition, all or a portion of determination module 104 may be contained and/or operated by application 208.

The systems described herein may perform step 310 in a variety of ways and/or contexts. In some examples, determination module 104 may monitor application 208 to determine when the user is accessing content within application 208. For example, determination module 104 may detect each time that the user opens or launches application 208. In some embodiments, after detecting that the user has opened application 208, determination module 104 may identify a specific user interface within application 208 that the user is currently viewing. For example, determination module 104 may determine which features or elements of application 208 are currently displayed to the user on the screen of computing device 202. In some examples, determination module 104 may periodically or continuously track the elements of application 208 that are displayed to the user as the user navigates through application 208.

As illustrated in FIG. 3, at step 320 one or more of the systems described herein may detect that the user has requested assistance with interacting with a specific portion of content displayed within the user interface. For example, detection module 106 may, as part of computing device 202 and/or application 208 in FIG. 2, detect that the user has requested assistance with interacting with portion of content 212 that is displayed within user interface 210.

The systems described herein may perform step 320 in a variety of ways and/or contexts. In some examples, detection module 106 may monitor application 208 to detect when the user has performed a predetermined action indicating that the user is requesting information that explains how to utilize portion of content 212. This action may contain and/or represent a variety of types of user inputs. Additionally or alternatively, this action may identify portion of content 212 as being of particular interest to the user. In other words, this action may be used to determine that portion of content 212 is of particular interest to the user.

In one example, the action may involve the user left-clicking and/or right-clicking on portion of content 212. Additionally or alternatively, the action may involve the user hovering or holding a mouse cursor over portion of content 212 for a predetermined amount of time (e.g., 2 seconds). In the event that computing device 202 is equipped with a touchscreen, the action may involve the user physically touching the graphical depiction of portion of content 212 as displayed on the touchscreen. In another example, the action may involve the user pressing a specific combination of keys on a keyboard connected to computing device 202.

Figure 4:
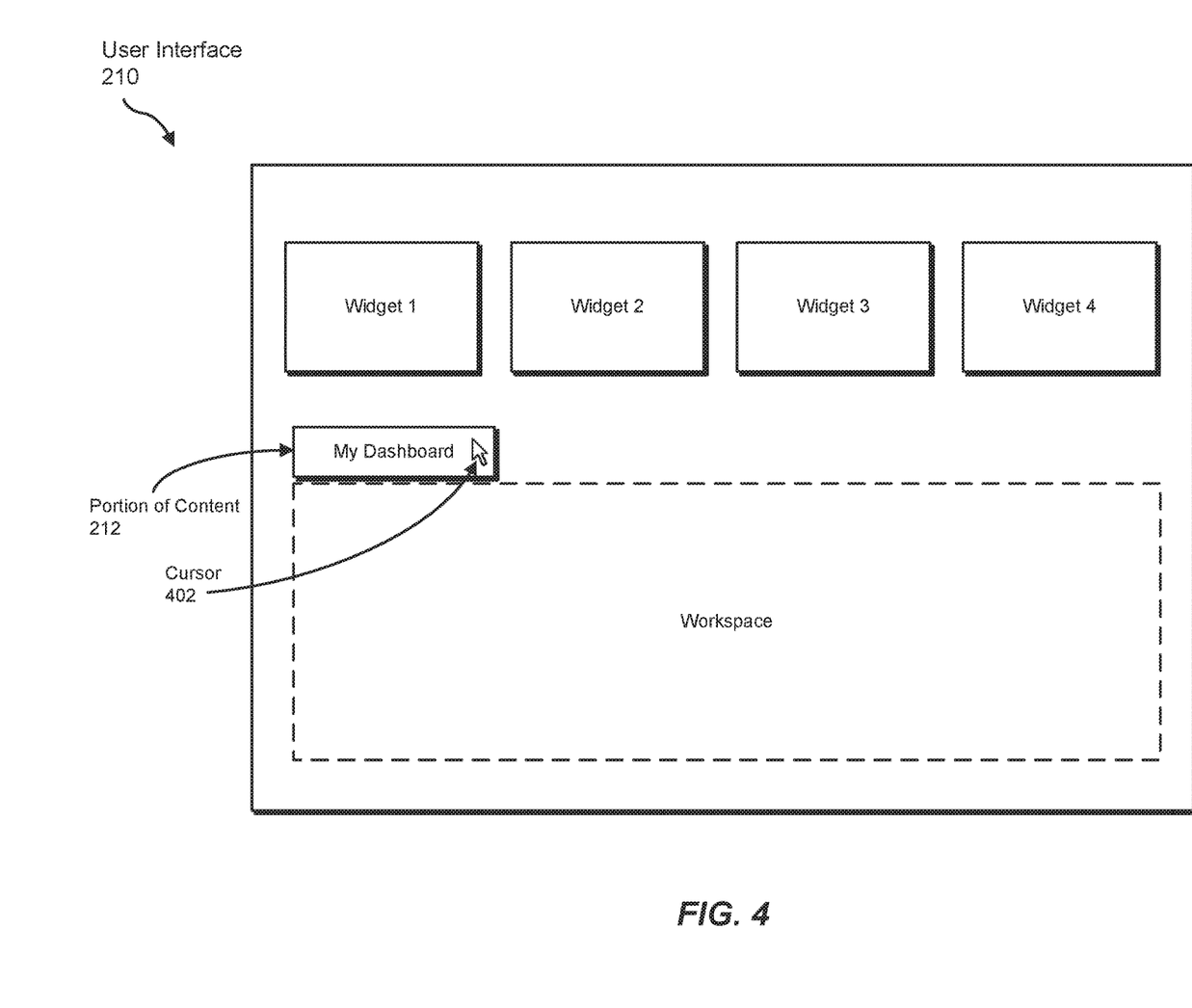
FIG. 4 is an illustration of an exemplary user interface of an application.

FIG. 4 illustrates an example of user interface 210. In this example, user interface 210 may include and/or display a variety of interactive portions of content, including several "widgets" (e.g., widgets 1-4), a "dashboard," and a "workspace." The user may interact with these portions of content at least in part via a cursor 402. In the example of FIG. 4, each of these portions of content may be configured such that right-clicking on the portion of content indicates, to detection module 106, that the user is requesting assistance with interacting with the portion of content. As such, detection module 106 may monitor (e.g., continuously) each portion of content to detect when the user right-clicks on a portion of content. For example, detection module 106 may intercept and analyze all or a portion of the input entered by the user into user interface 210 via a mouse connected to computing device 202.

In the example of FIG. 4, cursor 402 is positioned over a button labeled "My Dashboard." In this example, detection module 106 may detect that the user has right-clicked on this button. As such, detection module 106 may determine that the user has requested assistance with interacting with the "dashboard" feature of user interface 210.

Returning to FIG. 3, at step 330 one or more of the systems described herein may assist the user with interacting with the specific portion of content by (1) identifying, within a repository of software documentation that describes features of the application, information relevant to utilizing the specific portion of content and (2) dynamically integrating the relevant information into the user interface. For example, assistance module 108 may, as part of computing device 202 and/or application 208 in FIG. 2, assist the user with interacting with portion of content 212 by identifying relevant information 122 within repository of software documentation 120 and then dynamically integrating relevant information 122 into user interface 210 for presentation in connection with portion of content 212.

The systems described herein may perform step 330 in a variety of ways and/or contexts. In some examples, assistance module 108 may configure a visual panel to display relevant information 122 within user interface 210. The term "visual panel," as used herein, generally refers to any user interface and/or portion of a user interface that displays information relevant to utilizing content provided by an application. In one example, the visual panel may include and/or represent a graphical user interface and/or display window.

In some embodiments, assistance module 108 may display a visual panel that contains relevant information 122 within the same window and/or screen that displays application 208. For example, assistance module 108 may incorporate the visual panel directly into user interface 210. As an example, assistance module 108 may display relevant information 122 within user interface 210 such that relevant information 122 is adjacent to and/or inline with portion of content 212. In other examples, assistance module 108 may overlay a visual panel on top of user interface 210. For example, the visual panel may represent a pop-up window or similar type of user interface that covers at least a portion of user interface 210.

In some examples, assistance module 108 may position a visual panel within and/or over user interface 210 such that the visual panel does not interfere with (e.g., cover up) portion of content 212 (or additional portions of content displayed within user interface 210). For example, assistance module 108 may display relevant information 122 within an area of user interface 210 that does not include important and/or relevant portions of content. In one embodiment, in response to detecting that the user requests assistance with portion of content 212, assistance module 108 may dynamically select the position and/or placement of a visual panel containing relevant information 122 such that the visual panel does not disrupt the user's current view of user interface 210. In other embodiments, assistance module 108 may display a visual panel at a predetermined location within user interface 210. In general, assistance module 108 may incorporate a visual panel into user interface 210 in any manner and in any location such that relevant information 122 is conveniently displayed nearby portion of content 212.

Assistance module 108 may configure a visual panel to display relevant information 122 in a variety of ways. In some examples, assistance module 108 may populate a visual panel at least in part with information that is stored within repository of software documentation 120. For example, assistance module 108 (or an administrator of application 208) may search and/or analyze repository of software documentation 120 to identify relevant information 122. Assistance module 108 may then insert this information into a visual panel that is associated with and/or connected to portion of content 212. In general, assistance module 108 may populate a visual panel with any type or form of information that explains the purpose of portion of content 212, describes characteristics of portion of content 212, indicates how portion of content 212 is designed to be used, and/or is otherwise contextually-relevant to portion of content 212.

In one embodiment, assistance module 108 may pre-configure the visual panel with relevant information 122. For example, assistance module 108 may identify relevant information 122 and generate a visual panel that contains relevant information 122 prior to the user requesting assistance with interacting with portion of content 212. In one embodiment, assistance module 108 may pre-configure the visual panel (as well as additional visual panels associated with additional portions of content within application 208) during the process of developing application 208. In this way, assistance module 108 may automatically and/or immediately present the visual panel to the user in response to the user requesting assistance with interacting with portion of content 212.

In other embodiments, assistance module 108 may configure the visual panel with relevant information 122 in response to detecting that the user has requested assistance with interacting with portion of content 212. For example, in response to the request, assistance module 108 may identify relevant information 122 within repository of software documentation 120 and then dynamically populate a visual panel with relevant information 122. In this way, assistance module 108 may customize and/or optimize the visual panel based on the user's current request.

Figure 5:
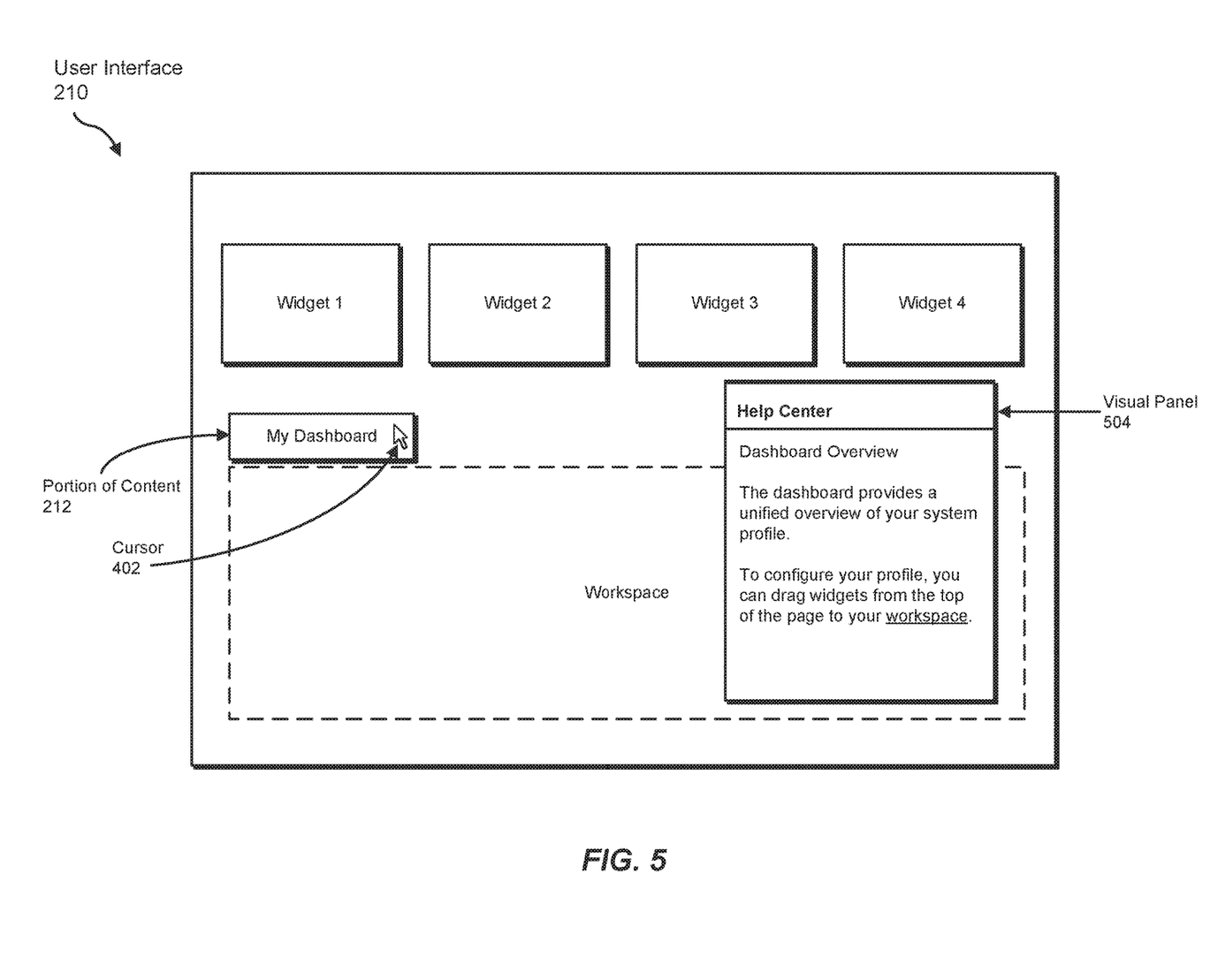
FIG. 5 is an illustration of an exemplary user interface of an application and an exemplary visual panel incorporated into the user interface.

FIG. 5 illustrates an exemplary visual panel incorporated into user interface 210. Specifically, FIG. 5 shows a visual panel 504 that assistance module 108 may incorporate into the user interface illustrated in FIG. 4 in response to the user's request for assistance with interacting with the "dashboard" feature of user interface 210. In this example, visual panel 504 may represent a user interface labeled "Help Center" that displays information instructing the user how to utilize the "dashboard" feature. As shown in FIG. 5, visual panel 504 may be overlaid on top of user interface 210 such that the "dashboard" feature remains visible and/or accessible to the user.

In some embodiments, assistance module 108 may configure a visual panel to dynamically identify, to the user, one or more features within user interface 210 that are relevant to portion of content 212. For example, assistance module 108 may include, within the visual panel, a clickable link associated with a specific portion of content within user interface 210. In response to detecting that the user has clicked on the link (or otherwise selected and/or followed the link), assistance module 108 may incorporate a visual pointer into user interface 210 that identifies and/or points to the specific portion of content within user interface 210. In one embodiment, the visual pointer may represent a graphical arrow or similar symbol.

Assistance module 108 may select and/or identify features within user interface 210 to via visual pointers in a variety of ways. In some examples, assistance module 108 may select features that are particularly relevant and/or important to portion of content 210 or application 208. For example, assistance module 108 may identify important features of application 208 by identifying particularly prominent topics and/or terms within repository of software documentation 120. Additionally or alternatively, assistance module 108 may identify important features of application 208 based on input from a user or administrator of application 208.

Figure 6:
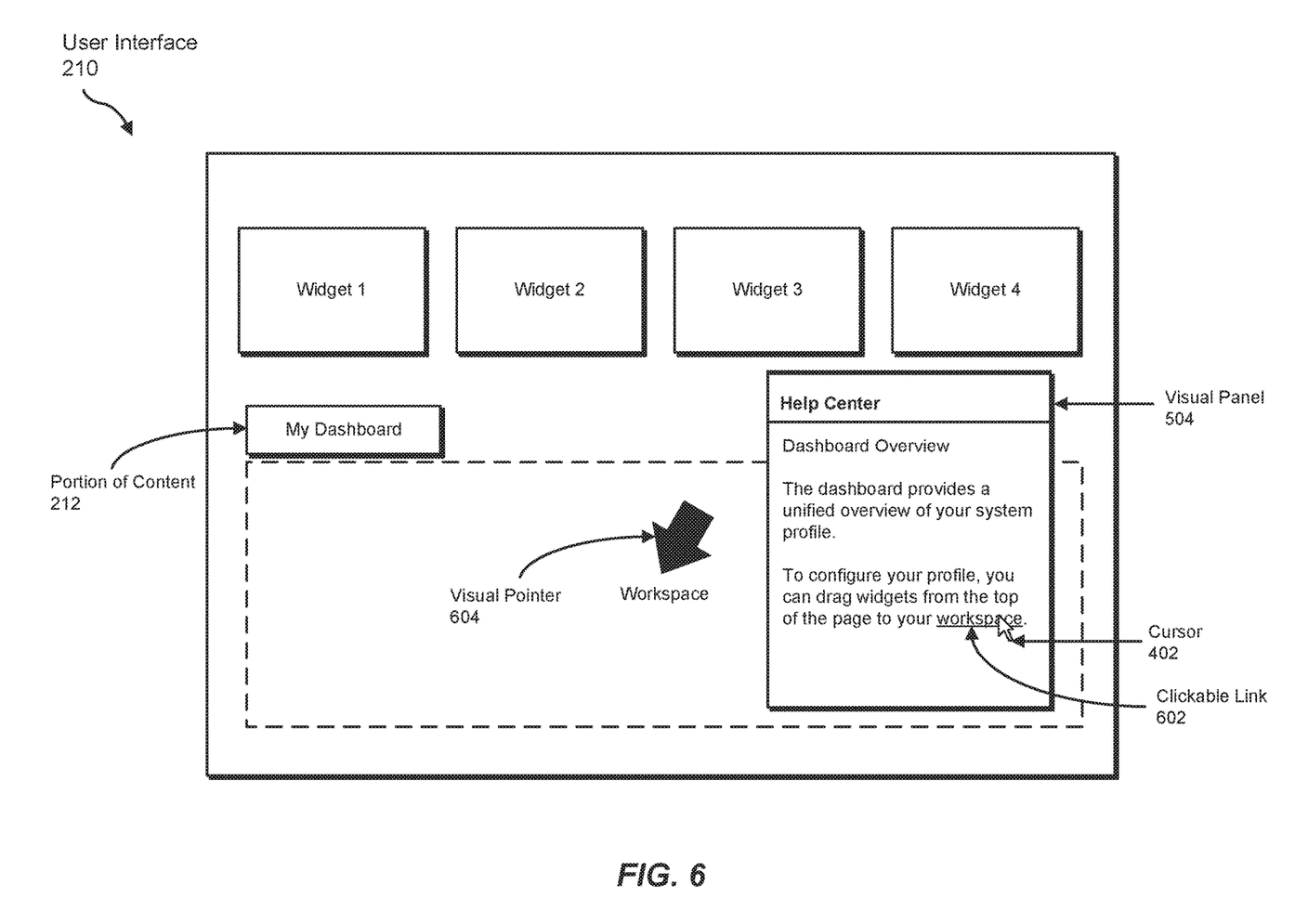
FIG. 6 is an illustration of an exemplary user interface of the application, an exemplary visual panel incorporated into the user interface, and an exemplary visual pointer that overlays the visual panel.

FIG. 6 illustrates an exemplary visual pointer 604. In this example, assistance module 108 may display visual pointer 604 within user interface 210 in response to detecting that the user has clicked on a clickable link 602 within visual panel 504. As shown in FIG. 6, clickable link 602 may correspond to the word "workspace." Accordingly, assistance module 108 may position visual pointer 604 within user interface 210 such that visual pointer 604 identifies and/or is directed towards the "workspace" feature within user interface 210. In some examples, visual panel 504 may contain one or more additional clickable links that may be used to identify additional portions of content within application 208. Furthermore, while FIG. 6 illustrates clickable link 602 as an underlined word, the disclosed systems may indicate the presence of a clickable link to a user in any other suitable manner, such as highlighting or labelling the link (as opposed to underlining).

In some embodiments, assistance module 108 may determine that the user no longer requests assistance with interacting with portion of content 212. For example, assistance module 108 may detect input provided by the user that indicates the user has stopped utilizing relevant information 122. As an example, assistance module 108 may detect that the user has begun interacting with a different portion of content within user interface 210. Additionally or alternatively, assistance module 108 may determine that relevant information 122 has been displayed within user interface 210 for a predetermined amount of time (e.g., 20 seconds). In response to determining or deducing that the user no longer requests assistance with portion of content 212, assistance module 108 may remove the visual panel that displays relevant information 122 from user interface 208 (as well as any associated visual pointers).

Figure 7:
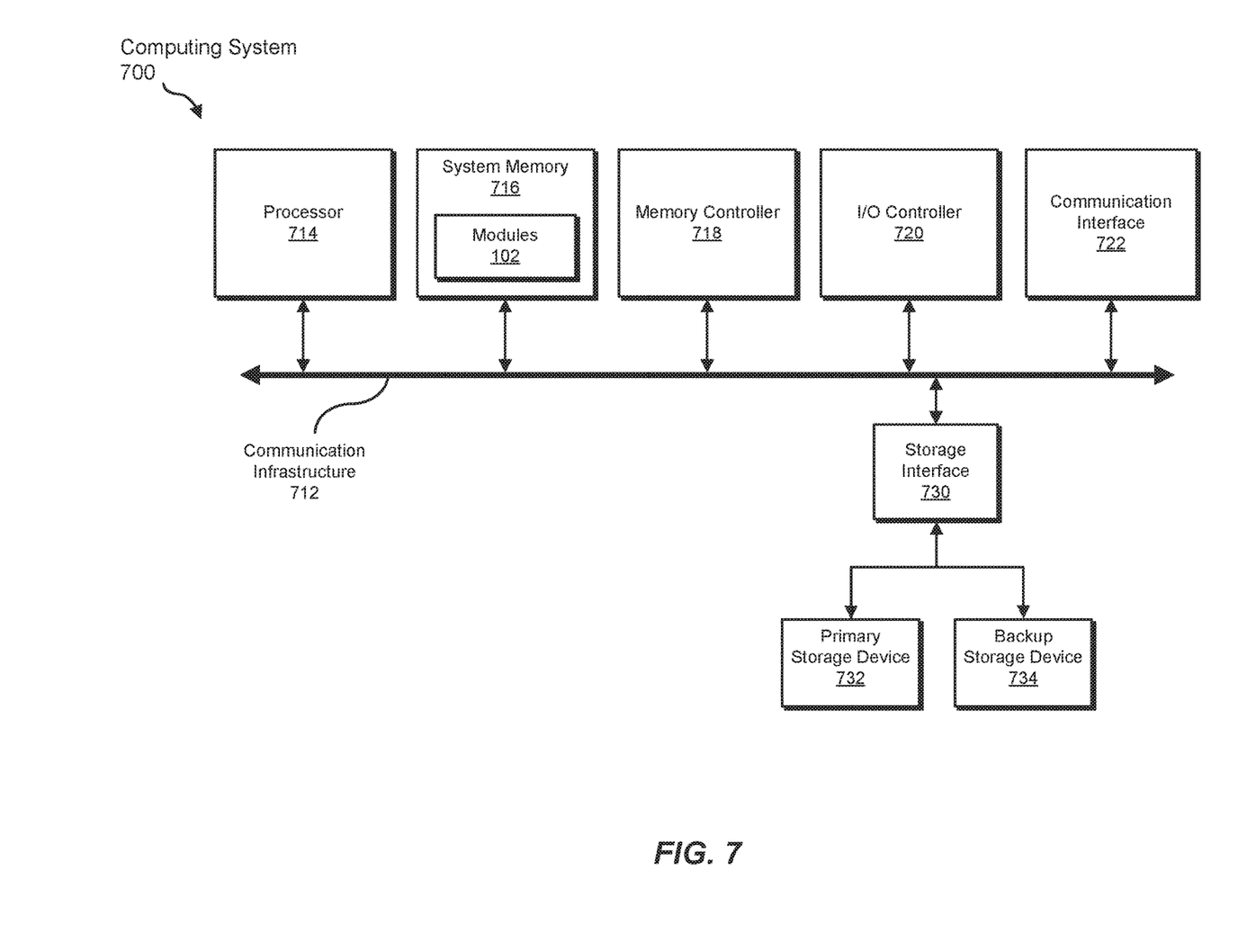
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 3. All or a portion of computing system 700 may also perform and/or be a means for performing and/or implementing any other steps, methods, or processes described and/or illustrated herein. In one example, computing system 700 may include and/or store all or a portion of modules 102 from FIG. 1.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   determining that a user is viewing a user interface of an application;
   detecting that the user has requested assistance with interacting with a specific portion of content displayed within the user interface; and
   assisting the user with interacting with the specific portion of content by:
     identifying, within a repository of software documentation that describes features of the application, information relevant to utilizing the specific portion of content;
     incorporating the relevant information into a visual panel to be displayed within the user interface, wherein incorporating the relevant information into the visual panel comprises incorporating a clickable link that:
       corresponds to a word that is included in the visual panel and represents a feature within the user interface; and
       when clicked by the user, causes a graphical arrow to be displayed in connection with the feature within the user interface of the application such that the specific portion of content is identified by the graphical arrow to the user;
     dynamically selecting a position within the user interface at which to display the visual panel such that the specific portion of content remains visible to the user; and
     displaying the visual panel at the selected position within the user interface.

2. The method of claim 1, wherein detecting that the user has requested assistance with interacting with the specific portion of content comprises detecting that the user has clicked on the specific portion of content.

3. The method of claim 1, wherein displaying the visual panel at the selected position within the user interface comprises displaying the visual panel within the same window that displays the user interface.

4. The method of claim 3, wherein the visual panel comprises an additional user interface that is overlaid on top of the user interface of the application.

5. The method of claim 3, wherein the visual panel is incorporated directly into the user interface of the application.

6. The method of claim 3, wherein:
   identifying the relevant information within the repository of software documentation comprises:
     identifying the relevant information prior to detecting that the user has requested assistance with interacting with the specific portion of content; and
     pre-configuring the visual panel to display the relevant information; and
   dynamically selecting the position within the user interface at which to display the visual panel comprises selecting the position in response to detecting that the user has requested assistance with interacting with the specific portion of content.

7. The method of claim 3, wherein identifying the relevant information within the repository of software documentation and incorporating the relevant information into the visual panel are both performed in response to detecting that the user has requested assistance with interacting with the specific portion of content.

8. The method of claim 1, further comprising:
determining that the user no longer requests assistance with interacting with the specific portion of content; and
in response to determining that the user no longer requests assistance, removing the visual panel from the user interface.

9. A system comprising:
a determination module, stored in memory, that determines that a user is viewing a user interface of an application;
a detection module, stored in memory, that detects that the user has requested assistance with interacting with a specific portion of content displayed within the user interface;
an assistance module, stored in memory, that assists the user with interacting with the specific portion of content by:
identifying, within a repository of software documentation that describes features of the application, information relevant to utilizing the specific portion of content;
incorporating the relevant information into a visual panel to be displayed within the user interface, wherein incorporating the relevant information into the visual panel comprises incorporating a clickable link that:
corresponds to a word that is included in the visual panel and represents a feature within the user interface; and
when clicked by the user, causes a graphical arrow to be displayed in connection with the feature within the user interface of the application such that the specific portion of content is identified by the graphical arrow to the user;
dynamically selecting a position within the user interface at which to display the visual panel such that the specific portion of content remains visible to the user; and
displaying the visual panel at the selected position within the user interface; and
at least one physical processor configured to execute the determination module, the detection module, and the assistance module.

10. The system of claim 9, wherein the detection module detects that the user has clicked on the specific portion of content.

11. The system of claim 9, wherein the assistance module displays the visual panel within the same window that displays the user interface.

12. The system of claim 11, wherein the assistance module overlays the visual panel on top of the user interface of the application.

13. The system of claim 11, wherein the assistance module incorporates the visual panel directly into the user interface of the application.

14. The system of claim 11, wherein the assistance module:
identifies the relevant information within the repository of software documentation prior to detecting that the user has requested assistance with interacting with the specific portion of content;
pre-configures the visual panel to display the relevant information; and
dynamically selects the position within the user interface at which to display the visual panel in response to the detection module detecting that the user has requested assistance with interacting with the specific portion of content.

15. The system of claim 11, wherein the assistance module identifies the relevant information within the repository of software documentation and incorporates the relevant information into the visual panel in response to the detection module detecting that the user has requested assistance with interacting with the specific portion of content.

16. A non-transitory computer-readable medium comprising one or more computer-readable instructions that, when executed by at least one processor of a computing device, cause the computing device to:
determine that a user is viewing a user interface of an application;
detect that the user has requested assistance with interacting with a specific portion of content displayed within the user interface; and
assist the user with interacting with the specific portion of content by:
identifying, within a repository of software documentation that describes features of the application, information relevant to utilizing the specific portion of content;
incorporating the relevant information into a visual panel to be displayed within the user interface, wherein incorporating the relevant information into the visual panel comprises incorporating a clickable link that:
corresponds to a word that is included in the visual panel and represents a feature within the user interface; and
when clicked by the user, causes a graphical arrow to be displayed in connection with the feature within the user interface of the application such that the specific portion of content is identified by the graphical arrow to the user;
dynamically selecting a position within the user interface at which to display the visual panel such that the specific portion of content remains visible to the user; and
displaying the visual panel at the selected position within the user interface.

* * * * *